(12) United States Patent
Farås et al.

(10) Patent No.: US 11,551,368 B2
(45) Date of Patent: Jan. 10, 2023

(54) ELECTRONIC DEVICES, METHODS, AND COMPUTER PROGRAM PRODUCTS FOR CONTROLLING 3D MODELING OPERATIONS BASED ON POSE METRICS

(71) Applicant: Sony Group Corporation, Tokyo (JP)

(72) Inventors: Sebastian Farås, Malmö (SE); Mattias Walls, Häljarp (SE); Johannes Elg, Helsingborg (SE); Fredrik Mattisson, Lund (SE); Fredrik Olofsson, Lund (SE); Lars Novak, Bjärred (SE)

(73) Assignee: Sony Group Corporation, Tokyo (JP)

( * ) Notice: Subject to any disclaimer, the term of this patent is extended or adjusted under 35 U.S.C. 154(b) by 292 days.

(21) Appl. No.: 16/640,105

(22) PCT Filed: Aug. 31, 2017

(86) PCT No.: PCT/US2017/049608
§ 371 (c)(1),
(2) Date: Feb. 19, 2020

(87) PCT Pub. No.: WO2019/045728
PCT Pub. Date: Mar. 7, 2019

(65) Prior Publication Data
US 2021/0133995 A1    May 6, 2021

(51) Int. Cl.
*G06T 7/70* (2017.01)
*G06T 7/55* (2017.01)
*G06T 19/00* (2011.01)

(52) U.S. Cl.
CPC .................. *G06T 7/55* (2017.01); *G06T 7/70* (2017.01); *G06T 19/006* (2013.01); *G06T 2207/30244* (2013.01)

(58) Field of Classification Search
CPC .......... G06T 7/55; G06T 7/70; G06T 19/006; G06T 2207/30244; G06T 2207/10016
See application file for complete search history.

(56) References Cited

U.S. PATENT DOCUMENTS

| 2013/0136300 A1* | 5/2013 | Wagner ..................... G06T 7/74 382/103 |
| 2013/0293686 A1 | 11/2013 | Blow et al. |

(Continued)

FOREIGN PATENT DOCUMENTS

| AU | 2011305154 A1 * | 4/2013 | ........... G05D 1/0246 |
| CN | 105074776 A * | 11/2015 | ........... G06T 19/006 |

(Continued)

OTHER PUBLICATIONS

Glocker et al. "Real-time RGB-D camera relocalization" 2013 IEEE International Symposium on Mixed and Augmented Reality (ISMAR) (pp. 173-179) (Oct. 1-4, 2013).

(Continued)

*Primary Examiner* — Matthew C Bella
*Assistant Examiner* — Kathleen M Broughton
(74) *Attorney, Agent, or Firm* — Myers Bigel, P.A.

(57) ABSTRACT

An electronic device includes a processor and a memory coupled to the processor. The memory includes a computer readable storage medium having computer readable program instructions stored therein that are executable by the processor to determine a position and/or orientation of sensor device that is arranged to capture data for a subject from the position and/or at the orientation, and, based on the position and/or orientation that was determined, control creation of a 3D representation of the subject from the data captured by the sensor device. Related methods and computer program products are also discussed.

18 Claims, 6 Drawing Sheets

(56) References Cited

U.S. PATENT DOCUMENTS

| | | | | |
|---|---|---|---|---|
| 2014/0126769 | A1* | 5/2014 | Reitmayr | G06V 20/64 382/103 |
| 2015/0304634 | A1* | 10/2015 | Karvounis | G06V 10/25 348/46 |
| 2016/0225158 | A1* | 8/2016 | Tsubota | G06V 10/462 |
| 2016/0292826 | A1* | 10/2016 | Beall | G06T 7/20 |

FOREIGN PATENT DOCUMENTS

| | | | |
|---|---|---|---|
| EP | 2851868 A1 | 3/2015 | |
| JP | 5016175 B2 * | 9/2012 | A61B 3/113 |

OTHER PUBLICATIONS

Klein et al. "Parallel Tracking and Mapping for Small AR Workspaces" 2007 6th IEEE and ACM International Symposium on Mixed and Augmented Reality (10 pages) (Nov. 13-16, 2007).

Notification of Transmittal of the International Search Report and the Written Opinion of the International Searching Authority, or the Declaration, in corresponding PCT Application No. PCT/US2017/049608 (15 pages) (dated Apr. 19, 2018).

Ondrúška et al. "MobileFusion: Real-Time Volumetric Surface Reconstruction and Dense Tracking on Mobile Phones" IEEE Transactions on Visualization and Computer Graphics 21(11):1251-1258 (Nov. 15, 2015).

Pan et al. "Interactive Model Reconstruction with User Guidance" 2009 8th IEEE International Symposium on Mixed and Augmented Reality (2 pages) (Oct. 19-22, 2009).

Strasdat et al. "Real-time monocular SLAM: Why filter?" 2010 IEEE International Conference on Robotics and Automation (8 pages) (May 3-7, 2010).

Williams et al. "Real-Time SLAM Relocalisation" 2007 IEEE 11th International Conference on Computer Vision (8 pages) (Oct. 14-21, 2007).

* cited by examiner

ELECTRONIC DEVICES, METHODS, AND COMPUTER PROGRAM PRODUCTS FOR CONTROLLING 3D MODELING OPERATIONS BASED ON POSE METRICS

CROSS REFERENCE TO RELATED APPLICATION

This application is a 35 U.S.C. § 371 national stage application of PCT International Application No. PCT/US2017/049608, filed on Aug. 31, 2017, the content of which is incorporated herein by reference in its entirety. The above-referenced PCT International Application was published in the English language as International Publication No. WO 2019/045728 A1 on Mar. 7, 2019.

FIELD

Embodiments described herein relate to image processing, and more particularly, to methods and devices for three-dimensional (3D) modeling.

BACKGROUND

Three-dimensional (3D) modeling is a technology that may be used for creating mathematical representation of a 3D subject. A 3D model or representation may be defined by a collection of points in 3D space connected by various geometric entities such as triangles, lines, curved surfaces, etc. The collection of points in 3D space may be determined from corresponding feature points in a set of images captured by an image capture device, such as two-dimensional (2D) images captured by a camera. Polygonal modeling may be used to create a 3D shell model representing a surface of a subject, by breaking down an abstract representation of the subject (such as a sphere, cone etc.), into a mesh representation (e.g. a collection of vertices, edges, and faces representing a "net" of interconnected triangles) that defines the shape of the subject in three dimensions. The shell may be sculpted to further define details, and may be textured to apply color and shading.

SUMMARY

Various embodiments described herein may provide advantages in 3D modeling operations based on captured images by ignoring, discarding, or otherwise preventing processing of certain images captured by an image capture device, if the pose at which the images were captured cannot be accurately determined. In doing so, degradation of a 3D representation due to deletion and/or replacement of data representing accurately-modeled portions thereof can be reduced and/or avoided.

According to some embodiments described herein, an electronic device includes a processor and a memory coupled to the processor. The memory includes a computer readable storage medium having computer readable program instructions stored therein that are executable by the processor to determine a position and/or orientation of a sensor device that is arranged to capture data for a subject from the position and/or at the orientation, and, based on the position and/or orientation that was determined, control creation of a 3D representation of the subject from the data captured by the device.

According to some embodiments described herein, a method of creating a 3D representation of a subject includes executing, by at least one processor, computer readable instructions stored in a non-transitory computer readable storage medium. The executing performs operations including determining a position and/or orientation of a sensor device that is arranged to capture data for the subject from the position and/or at the orientation, and based on the position and/or orientation that was determined, controlling creation of the 3D representation of the subject from the data captured by the sensor device.

According to some embodiments described herein, a computer program product includes a computer readable storage medium having computer readable program instructions embodied therein. When executed by a processor, the computer readable program instructions cause the processor to perform operations including determining a position and/or orientation of a sensor device that is arranged to capture data for a subject from the position and/or at the orientation, and based on the position and/or orientation that was determined, controlling creation of the 3D representation of the subject from the data captured by the sensor device.

In some embodiments, controlling the creation of the 3D representation may include controlling execution of computer readable program code that creates the 3D representation by the processor. For example, the position and/or orientation may define a pose, and an accuracy of the pose that was determined may be identified. Based on the accuracy of the pose, execution of computer readable program code that creates the 3D representation of the subject may be transitioned or toggled between active and inactive states.

In some embodiments, the sensor device may be an image capture device, and the accuracy of the determined pose may indicate a validity or reliability of the images captured by the image capture device from the position and/or at the orientation. The transitioning to the inactive state may prevent use of image data from the images in creation of the 3D representation when the accuracy of the determined pose is low.

In some embodiments, identifying the accuracy of the pose may include calculating a pose quality including a covariance metric for the pose, and comparing the covariance metric to a predetermined threshold.

In some embodiments, identifying the accuracy of the pose may include calculating a variance metric based on differences in respective positions indicated by feature points in foreground and/or background portions of the of the images captured by the image capture device, and determining the accuracy of the pose by comparing the variance metric to a predetermined threshold.

In some embodiments, the computer readable program code may include computer readable program instructions for editing a 3D mesh representation of the subject represented in the images. Controlling the creation of the 3D representation may include transitioning between active and inactive states of the editing based on the pose to prevent the editing of the 3D mesh representation based on image data from the images when the comparing indicates that the pose quality is below the predetermined threshold, where the editing may result in deletion of one or more accurate portions of the 3D mesh representation.

In some embodiments, the editing may include sculpting of the 3D mesh representation, and transitioning the execution may include transitioning the sculpting to the inactive state when the comparing indicates that the pose quality exceeds the predetermined threshold.

In some embodiments, transitioning the execution may further include transitioning the sculpting to the active state when the comparing indicates that the pose quality metric is within the predetermined threshold.

In some embodiments, controlling the creation may further include providing an indication that the pose quality exceeds the predetermined threshold for output via a user interface.

In some embodiments, the predetermined threshold may be a first threshold, and controlling the creation may further include identifying a suggested pose for re-initialization when the comparing indicates that the pose quality exceeds a second threshold, and providing a direction to alter the pose based on the suggested pose for output via a user interface.

In some embodiments, providing the direction to alter the pose may include generating an augmented reality view including the direction to alter the pose in combination with the images captured by the image capture device from the position and/or at the orientation, and providing the augmented reality view for display via the user interface.

In some embodiments, the suggested pose may be one of a plurality of poses of the image capture device that corresponds to one or more previous images captured by the image capture device.

In some embodiments, the computer readable program code may be computer readable program instructions for depth calculation, and controlling the creation may further include preventing execution of the computer readable program instructions for depth calculation operations, based on the pose that was determined.

Other electronic devices, methods, and/or computer program products according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

DETAILED DESCRIPTION

Figure 1A:
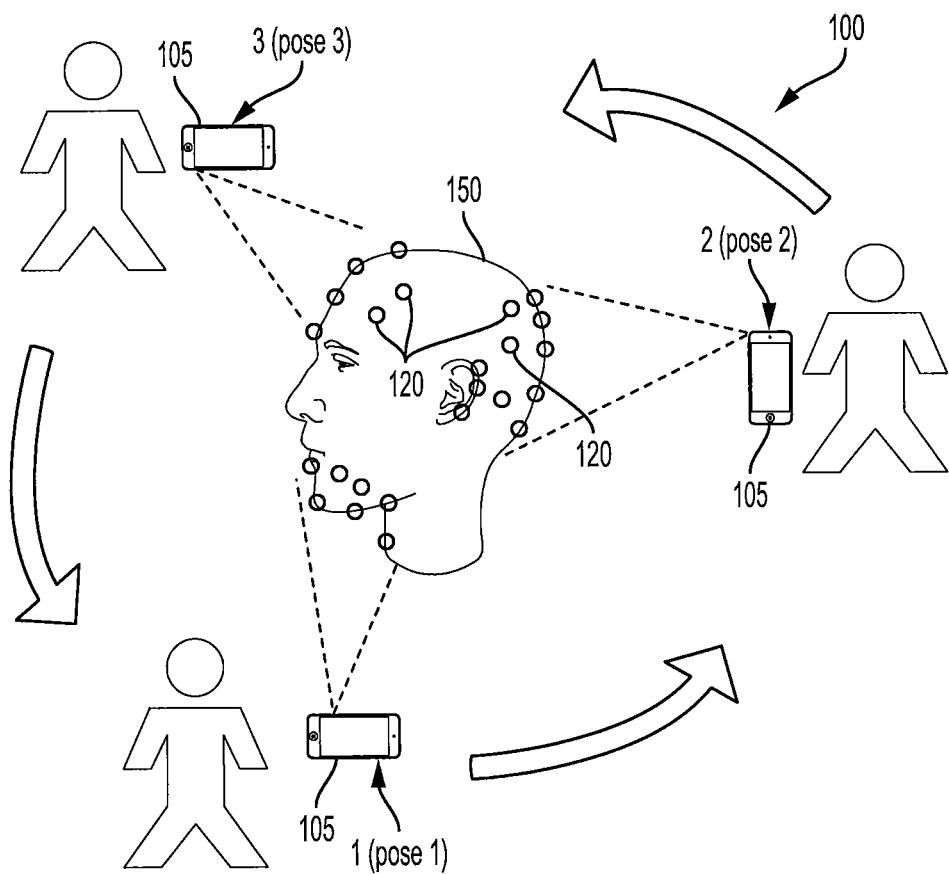
FIGS. 1A and 1B illustrate example operations of an electronic device for controlling operations for creation of a three-dimensional (3D) representation of a subject in accordance with some embodiments described herein.

Converting two-dimensional (2D) images (for example, as captured by a camera) or depth maps (for example, as detected by time-of-flight depth sensors) into a three-dimensional (3D) representation (also referred to herein as a 3D model) includes multiple, somewhat independent image processing operations, including pose determination, depth determination, sculpting, and texturing. Pose determination may utilize Simultaneous Localization and Mapping (SLAM), including image-based positioning techniques, to track a location (including position and orientation) of the image capture device or other detecting device in an operating environment. Pose determination may alternatively utilize non-imaging and/or non-SLAM based positioning techniques. Depth determination may involve calculation of 3D depth information (e.g., [X, Y, Z] coordinates, indicating the distance from point (X, Y, Z) to a position of the image capture device) from a set of images by identifying matching elements in two or more images and triangulating the positions of the matched elements in 3D space. Multiple depth maps can be combined to create an initial polygon mesh representation of a subject represented in the set of images. Sculpting may involve subdividing surfaces of the initial polygon mesh representation to derive adjusted locations and/or displacements for the vertex positions of some polygons, and storing the adjusted locations and/or displacements. The values of respective vertices of those polygons may thus be adjusted from their initial value, such that the sculpted model may iteratively define portions with an adjusted topology (representing additional detail) relative to the initial or previous polygon mesh representation. That is, after sculpting, the mesh representation may include vertices whose values have changed from the initial value, and vertices whose values have not changed from the initial value. Texturing and other material application operations may involve applying colors from the original set of images to the 3D mesh representation, for example, by projecting the images onto the mesh and/or segments thereof. Operations for creating a 3D representation, such as those described above, may be collectively referred to herein as 3D scanning.

Some embodiments described herein arise from realization that, in image processing operations to create a 3D representation of a subject from data captured by a sensor device (for example, images captured by an image capture device), the 3D representation may be degraded if the corresponding pose of the image capture device or other sensor device cannot be accurately determined. Embodiments described herein are thus directed to using pose quality metrics (indicating an accuracy of an estimated pose of the sensor device) for controlling states of execution of the computer readable program code that create the 3D representation of a subject based on the data captured by the sensor device.

More particularly, embodiments described herein are directed to passing or otherwise providing pose covariance, feature point variance, and/or other pose quality metrics to other operations for creating a 3D representation of a subject (e.g., depth calculation, sculpting, and/or texturing) to control states of execution of the associated image processing and avoid image processing based on data that may be below a threshold for reliability. For example, when the pose quality is poor or falls outside an acceptable range, further operations, including subdivision of surfaces of polygons defined by the 3D mesh representation to derive adjusted locations for the vertex positions and storing the adjusted locations in an image map, may be paused or otherwise prevented until an acceptable pose quality is achieved. In another example, depth calculation operations may be paused or stopped based on images corresponding to a poor pose quality. That is, pose quality and/or other pose-based metrics may be used dynamically to control one or more subsequent 3D modeling operations, in order to ignore, discard, or otherwise prevent processing of certain images or other data captured by a sensor device and thus prevent deletion, degradation, and/or replacement of accurate model data with inaccurate model data. Further embodiments described herein are directed to providing user feedback, including augmented reality-based user directions, to improve the pose quality of the sensor device prior to resuming 3D modeling operations.

Figure 1B:
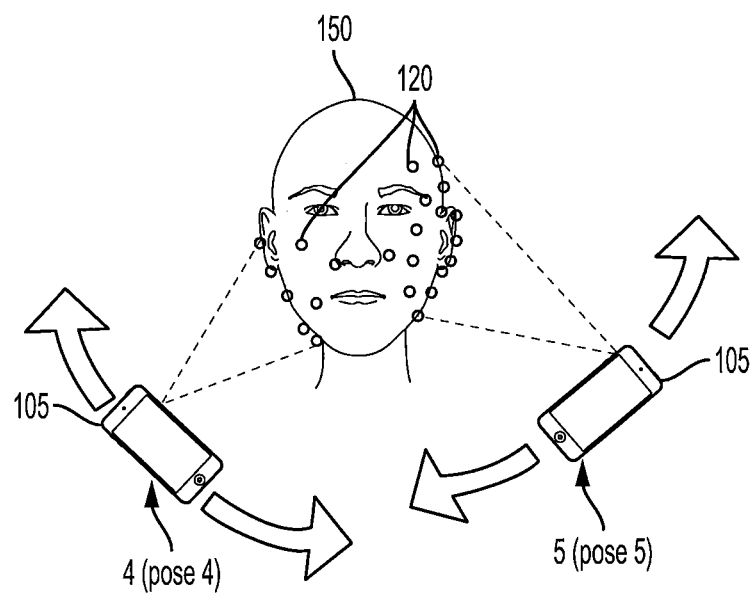

FIGS. 1A and 1B illustrate an example operating environment and example operations of an electronic device for controlling creation of a 3D representation of a subject in accordance with some embodiments described herein. As shown in FIGS. 1A and 1B, an electronic sensor device, such as an image capture device 105 (illustrated as a mobile phone including a camera by way of example), is configured to execute computer readable program instructions to create and display a 3D representation by scanning a subject 150 in an operating environment 100. The image capture device 105 may include an image sensor, such as a charged coupled device (CCD) or CMOS sensor, and an arrangement of camera components that are implemented to capture images, including a lens and focusing assembly. The image sensor can generate digital image data corresponding to the images that the image sensor captures through the associated lens in real time. In FIG. 1A, the electronic image capture device 105 is moved between various locations in the operating environment 100 to capture images representing the subject 150 from various positions and/or orientations 1-3. In FIG. 1B, the image capture device 105 is likewise moved between various angles to capture images representing the subject 150 from various positions and/or orientations 4-5. Although described primarily herein with reference to an image capture device, it will be understood that the electronic sensor device 105 may represent any electronic device that is operable to capture or otherwise obtain data for creating a 3D representation of the subject 150 based on sensor input, whether by utilizing image sensors, non-imaging sensors such as depth sensors, and/or other sensors.

The positions and/or orientations 1-5 may be tracked to determine or define respective poses of the image capture device 105 in the operating environment 100. The determined poses 1-5 thus provide an estimate of the positions and/or orientations in the operating environment 100 at which the images were captured. In some embodiments, the poses 1-5 may be estimated or otherwise determined using simultaneous localization and mapping (SLAM) operations.

Feature points 120 in the images may be also identified and tracked. The feature points 120 may indicate points of interest derived or otherwise determined from image data in the images captured by the image capture device 105, which are distinguishable over several images of the same scene. The feature points 120 may include points of interest in the foreground and/or the background of the images captured by the image capture device 105. Feature points may be subsets of the image domain, often in the form of isolated points, continuous curves or connected regions. The feature points 120 may thus be indicative of respective positions of the subject 150, which may differ in the various captured images. The feature points 120 may also be indicative of the poses 1-5 and/or calibration of the image capture device 105. For example, by tracking 'movement' (i.e., changes) of the corresponding feature points 120 by comparison of consecutive or successive image frames captured by the image capture device 105 as the image capture device 105 is moved in space/position and pointing direction/orientation in the operating environment 100, the feature points 120 can provide a sparse map of the subject 150, which can be used to determine the poses 1-5 corresponding to the captured images. The poses 1-5 can be used for image rectification and to compute disparities between successive images captured by the image capture device. Respective depths of portions of the subject 150 in the image can be computed based on the disparities, creating a dense map of the subject 150 from multiple depth maps. The multiple depth maps can be combined to create an initial polygon mesh.

As described in greater detail herein, an accuracy of the determined poses 1-5 (also referred to herein as pose quality) can be used to classify the images captured by the image capture device 105 at the corresponding positions and/or orientations in terms of validity or reliability for further image processing operations, and execution of computer readable program code that creates a 3D representation of the subject 150 can be controlled (for example, by transitioning program execution between active and inactive states) to prevent use of image data from images captured at positions where the accuracy is below a desired threshold.

Pose quality can be defined by the ratio of salient versus inlier feature counts. If the ratio is above a certain threshold (e.g., >0.75), the pose quality may be considered good or acceptable; if the pose quality is below a certain threshold (e.g., <0.5) it may be considered bad or poor. That is, pose quality may be a numerical value estimate that indicates an accuracy of a determined pose, and, in accordance with embodiments described herein, can indicate whether the images captured by the camera at the determined pose can be accurately used for creating a 3D model of a subject that is represented in the images. If the pose quality indicates that an invalid pose is maintained for a predetermined duration (e.g., below a further threshold, because of too few point correspondences for a number of successive image frames), re-localization or other re-initialization operations may be performed. The pose quality may be calculated as a part of or during SLAM operations, and thus, may be referred to as a SLAM-based metric in some embodiments.

The pose quality may be based on calculation of a covariance metric for each determined pose 1-5. The covariance metrics may be computed by regression analysis (for example, using a non-linear least-squares algorithm) from comparison of X, Y, and/or Z coordinates in the captured images, and may be stored as a matrix. Additionally or alternatively, the pose quality may be based on calculation of a feature point variance metric by identifying and tracking foreground (FG) and background (BG) feature points 120 in the images captured at each pose 1-5. The feature point variance metrics may indicate differences in respective positions, such as differences in depths, of the foreground and/or background feature points 120 in consecutive or successive images captured by the image capture device 105 at the different poses 1-5, where successive images containing feature points indicative of multiple changes in depth may be indicative of higher pose quality. That is, either or both the pose covariance and the feature point variance may be used to identify the accuracy of a determined pose 1-5 in accordance with embodiments described herein.

Figure 2A:
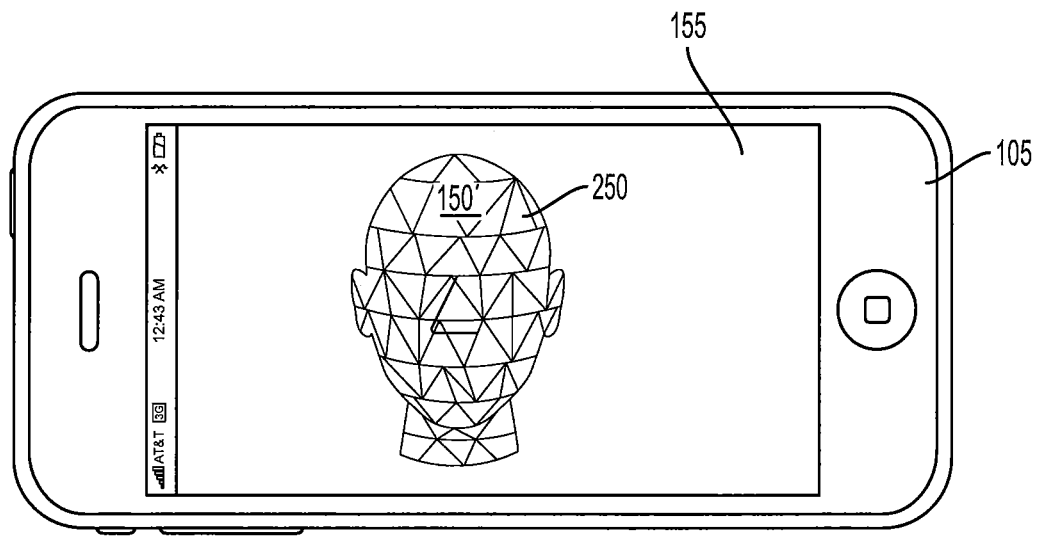
FIGS. 2A and 2B illustrate example user interfaces of the electronic device of FIGS. 1A and 1B for controlling operations for creation of a 3D representation of a subject in accordance with some embodiments described herein.
Figure 2B:
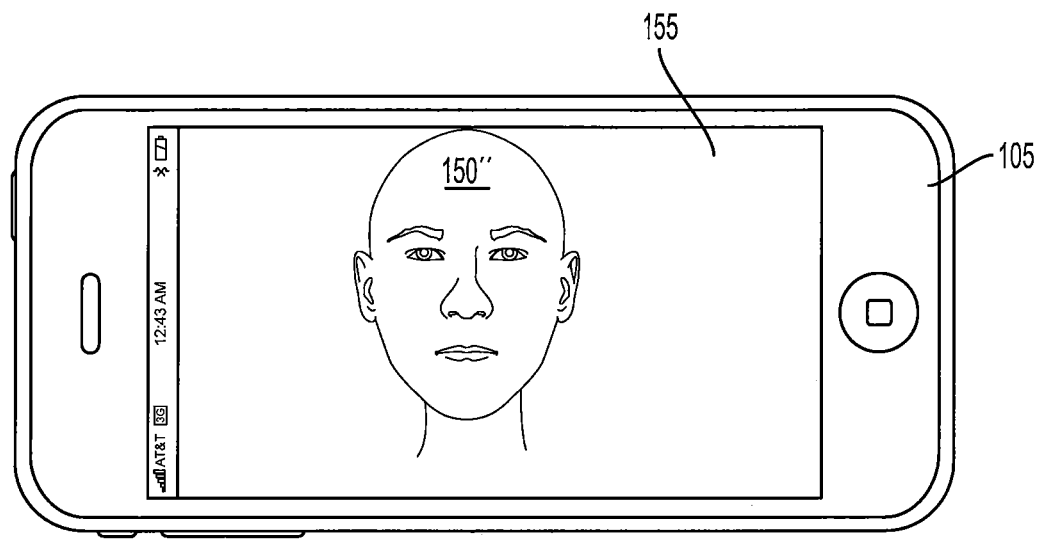

FIGS. 2A and 2B are example user interfaces of the electronic device of FIGS. 1A and 1B for controlling creation of a 3D representation of the subject 150 in accordance with some embodiments described herein. In particular, FIG. 2A illustrates a 3D mesh representation 150' of the subject 150 that is created from the images captured by the image capture device 105 at the various poses 1-5, as displayed via a user interface 155. The 3D mesh representation is illustrated as a polygon (in particular, a triangle) mesh 250. FIG. 2B illustrates the completed 3D representation or model 150" of the subject 150. The completed 3D representation 150" of FIG. 2B is defined by performing sculpting and texturing operations based on the polygon mesh 250 of FIG. 2A.

In greater detail, sculpting operations can be used to edit and refine the polygon mesh 250 based on additional images captured by the image capture device 105 at different poses 1-5 to further subdivide surfaces defined by the polygons of the polygon mesh 250, thereby creating and storing new locations for the vertex positions of the polygons. Sculpting may involve ray casting, where for respective point in an image for which the depth information has been determined, a 3D point is calculated, and the intersection of the ray (formed by the origin and this point) and the polygon mesh 250 is calculated. Based on the distance between the intersection points, a force may be calculated and used to push or pull the corresponding part of the polygon mesh 250, resulting in adjusted values for the vertices of the polygons. The polygon mesh 250 may start as a simple sculpture, such as sphere defined by a plurality of triangles. Further operations may include detecting which parts of the polygon mesh 250 may benefit from higher detail, and tessellating the appropriate triangles.

Intermediate mesh representations 150' may be displayed on the user interface 155 of the image capture device 105 during the image processing operations described herein. For real-time display of the 3D mesh representation 150' via the user interface 155, the polygon mesh 250 can be rotated/translated based on detection of movement of the image capture device 105 around the subject 150. This may be accomplished by using one or more internal sensors of the image capture device 105 (e.g., a gyroscope, accelerometer and/or digital compass typically included in a mobile phone), and/or by detecting feature points in the images and using the feature points to calculate the rotation/translation of the 3D mesh representation 150'. The mesh representation 150' and/or completed 3D model 150" may be stored in a computer readable memory for subsequent use, such as for display on another electronic device, for use as part of a 3D, augmented-reality, and/or immersive environment, and/or to generate a 3D print file, which may be used by a 3D printer to print a physical copy of the 3D model representation 150".

Embodiments described herein control execution of computer program instructions that create the 3D representation 150" by classifying images captured by the image capture device 105 based on an accuracy of the corresponding determined pose 1-5, and transitioning or toggling between active and inactive states of execution of the computer readable program code that creates the 3D representation 150", including operations for editing or refining the 3D mesh representation 150'. For example, the sculpting of the 3D mesh representation 150' shown in FIG. 2A may involve three user-observable states: working (where computer program instructions are executed to generate or edit the 3D mesh representation 150' based on the captured images), paused (where execution of the computer program instructions are temporarily transitioned to an inactive state, but the current state of the 3D mesh representation 150' may be displayed via the user interface 155), and stopped (where execution of the computer program instructions are transitioned to the inactive state, but the 3D mesh representation 150' may not be displayed via the user interface 155). By transitioning or toggling between these active and inactive states based on determined pose quality or other SLAM-based metrics in real-time, embodiments of the present disclosure may reduce or prevent image processing operations based on image data having a greater likelihood of reducing accuracy of the 3D representation.

Figure 3:
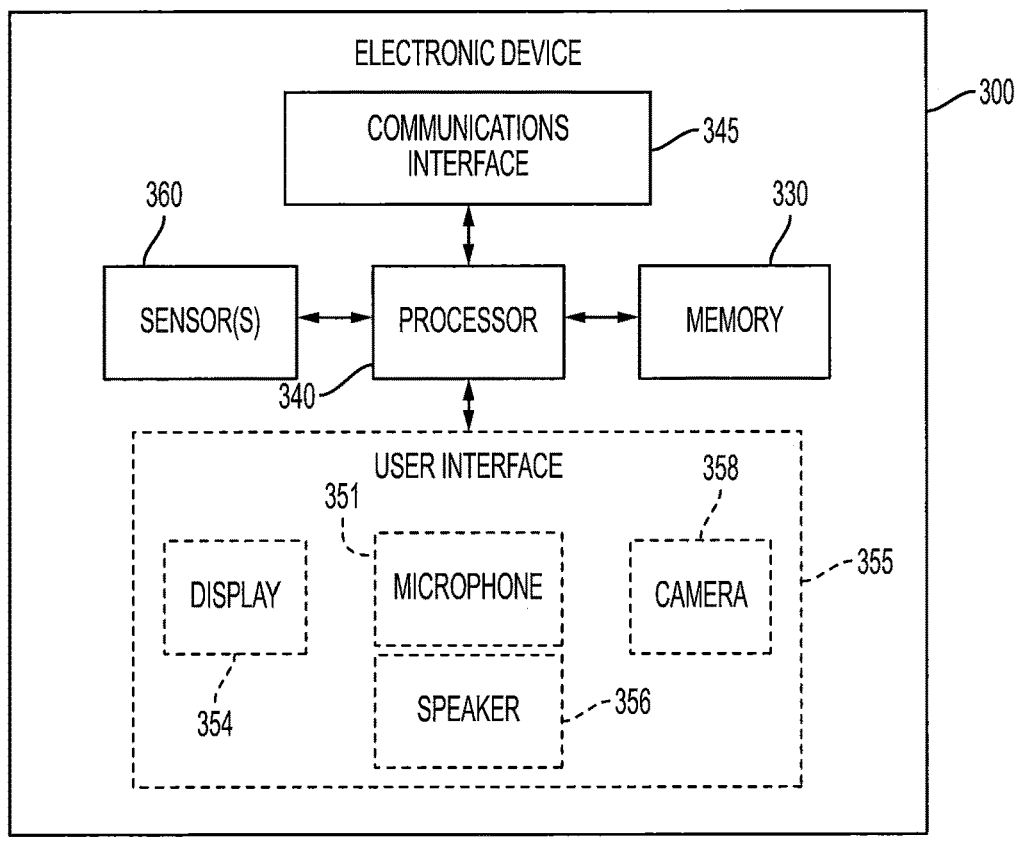
FIG. 3 is a block diagram illustrating example components of an electronic device for controlling operations for creation of a 3D representation of a subject in accordance with some embodiments described herein.

FIG. 3 is a block diagram illustrating example components of an electronic device 300 in accordance with some embodiments described herein. The electronic device 300 may use hardware, software implemented with hardware, firmware, tangible computer-readable storage media having instructions stored thereon and/or a combination thereof, and may be implemented in one or more computer systems or other processing systems. The electronic device 300 may also utilize a virtual instance of a computer. As such, the devices and methods described herein may be embodied in any combination of hardware and software As illustrated in FIG. 3, the electronic device 300 includes a processor circuit 340, such as a microprocessor or microcontroller that is configured to control operations of the electronic device 300, a memory 330, a communications interface 345, a user interface 355, and one or more sensors 360 coupled to the processor 340. The memory 330 may be a general purpose memory that is used to store both program instructions for the processor 340 as well as data, such as image data, configuration data, and/or other data that may be accessed and/or used by the processor 340. The memory 330 may include a nonvolatile read/write memory, a read-only memory, and/or a volatile read/write memory. In particular, the memory 330 may include a read-only memory in which basic operating system instructions are stored, a non-volatile read/write memory in which re-usable data, such as configuration information, may be stored, as well as a volatile read/write memory, in which short-term instructions and/or temporary data may be stored. As such, the memory 330 can store computer readable program code or instructions that, when executed by the processor circuit 340, carry out operations as described below with reference to the flowcharts of FIGS. 5-7. The memory 330 may also include systems and/or devices used for storage of data captured by the electronic device 300.

The sensor(s) 360 may include imaging, inertial, and/or odometry sensors that are configured to detect movement and/or orientation of the electronic device 300, by providing data or signals indicative of the movement and/or orientation to the processor 340. For example, the sensor(s) 360 may include one or more accelerometers, gyroscopes, magnetometers, and/or other sensors configured to detect movement/inertia (and/or orientation) of the electronic device 300.

The user interface 355 may include various input/output components, including a display 354 and/or a camera 358. In some embodiments, the user interface 355 may optionally include a speaker 356 and/or a microphone 351. The user interface 355 may thus be configured for receiving input, displaying intermediate operations/data, and/or exporting output of the embodiments described herein. The electronic device 300 may be a mobile telephone or a laptop/tablet computer including these components. Alternatively, the electronic device 300 may be a wearable wireless electronic device in which one or more of the illustrated components of the user interface 355 may be omitted.

The electronic device 300 may also include one or more communication interfaces 345 that may communicate with other communication devices and/or one or more networks, including any conventional, public and/or private, real and/or virtual, wired and/or wireless network, including the Internet. The communication interfaces 345 may be used by the processor 340 to transfer information in the form of signals between the electronic device 300 and another computer system or a network (e.g., the Internet). The communication interfaces 345 may include a modem, a network interface (such as an Ethernet card), a wireless interface, a radio interface, a communications port, a PCM-CIA slot and card, or the like. These components may be conventional, such as those used in some conventional computing devices, and thus further description of their functionality with respect to conventional operations is not provided herein.

Figure 4:
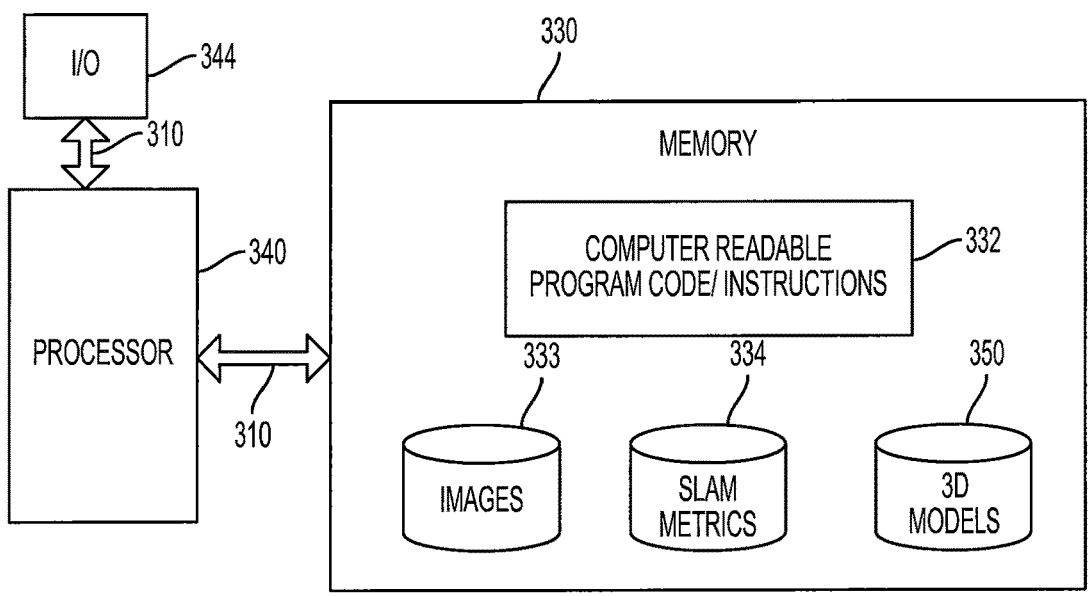
FIG. 4 is a block diagram illustrating an example processor and memory of an electronic device for controlling operations for creation of a 3D representation of a subject in accordance with some embodiments described herein.

FIG. 4 is a block diagram illustrating an example processor and memory of an electronic device for controlling creation of a 3D representation of a subject in accordance with some embodiments described herein in greater detail. The processor 340 and memory 330 may be included in an electronic device, such as the image capture device 105 and/or the electronic device 300 described herein, or may be included in one or more other electronic devices, such as one or more computer servers that are remotely located relative to the operating environment 100 and the image capture device 105.

As shown in FIG. 4, the processor 340 and memory 330 are coupled by an interconnect 310. The interconnect 310 may be an abstraction that represents any one or more separate physical buses, point to point connections, or both connected by appropriate bridges, adapters, or controllers. The interconnect 310, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The processor 340 may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices, which may be collocated or distributed across one or more data networks. The processor 340 may be configured to execute computer program code/instructions 332 from the memory 330. The computer program code/instructions 332 stored in the memory 330 may represent one or more program modules that are executable to perform some or all of the operations for one or more of the embodiments described herein.

The memory 330 may also include a storage repository 333/334/350. The storage repository 333/334/350 may be accessible to the processor 340 via the system interface 310 and may additionally store information associated with the electronic device 300 and/or operations performed thereby responsive to execution of the computer readable program code/instructions 332. For example, in some embodiments, the storage repository may contain 3D representation/model data 350, image data 333, and/or pose quality metrics data 334 as described herein.

Figure 5:
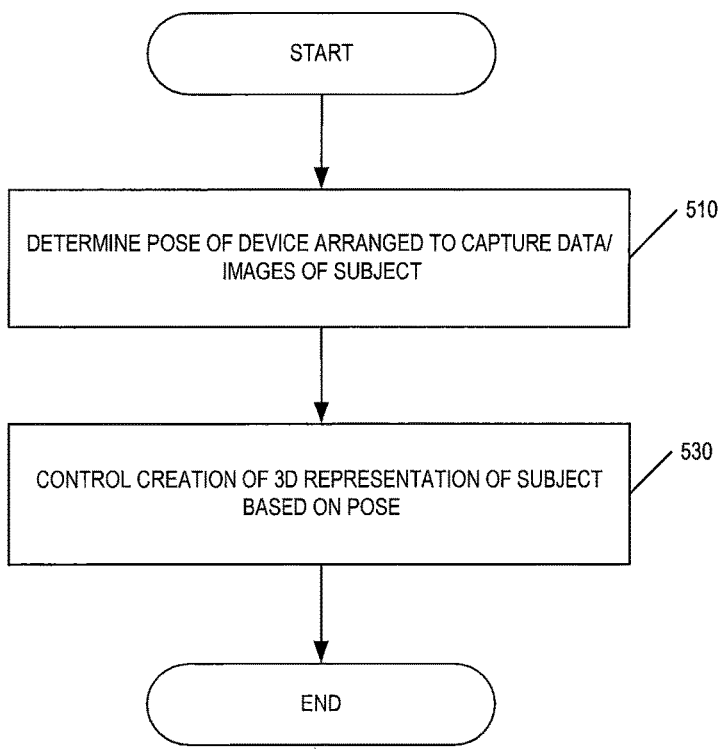
FIGS. 5-7 are flowcharts illustrating example operations for controlling operations for creation of a 3D representation of a subject in accordance with some embodiments described herein.
Figure 6:
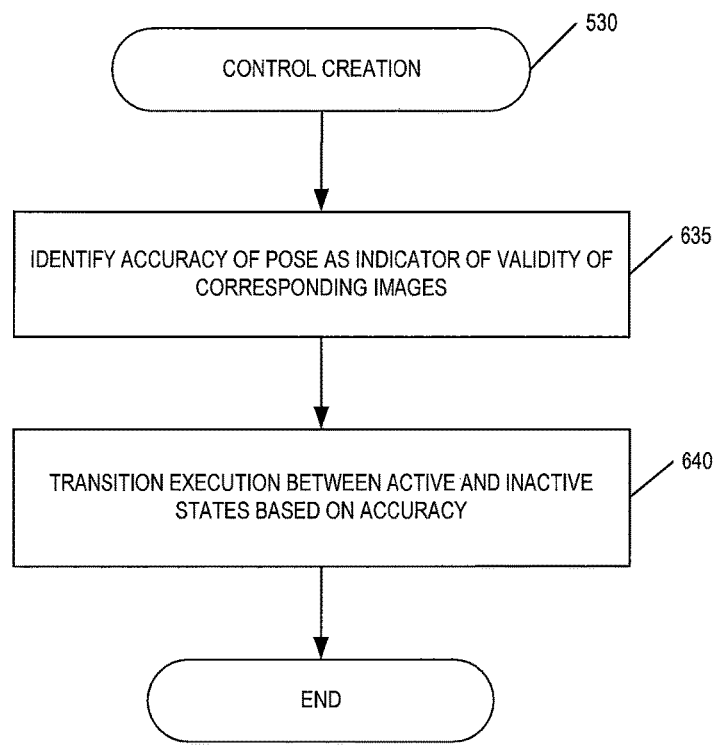
Figure 7:
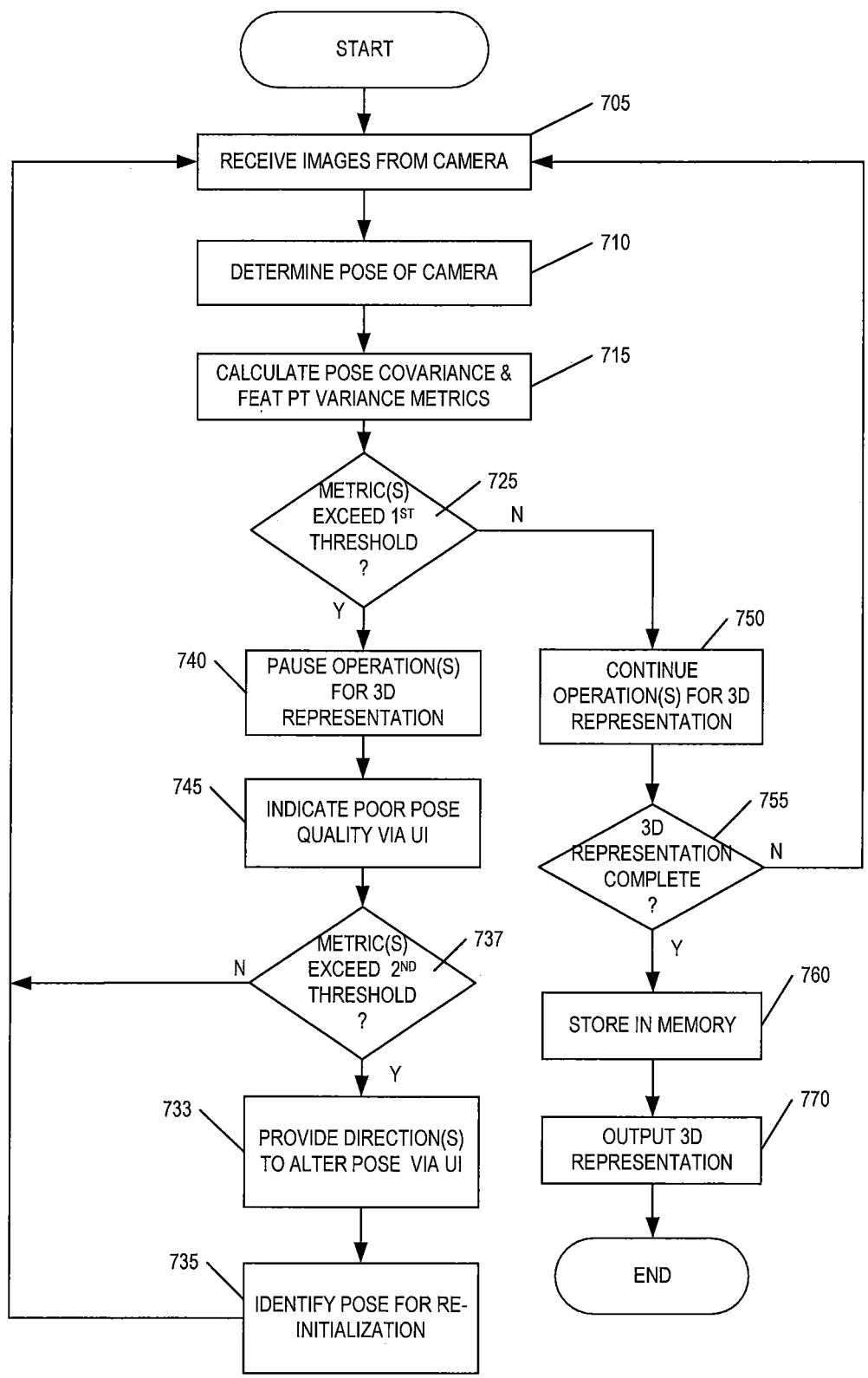

FIGS. 5-7 are flowcharts illustrating example operations for controlling execution of computer readable program code that creates a 3D representation of a subject in accordance with some embodiments described herein. The operations of FIGS. 5-7 may be performed by one or more processors, such as the processor 340 shown in FIGS. 3-4, responsive to execution of computer readable program instructions stored in a memory, such as the computer readable program code/instructions 332 stored in the memory 330 shown in FIGS. 3-4. The blocks of FIGS. 5-7 may thus define executable computer readable program code for the respective operations illustrated therein.

Referring now to FIG. 5, an image capture device, such as the image capture device 105 or the electronic device 300 discussed above, is arranged to capture images of a subject, such as the subject 150, in an operating environment, such as the environment 100. A position and/or orientation defining a pose of the image capture device at which the images were captured is determined at block 510. The pose may be determined using any of a variety of techniques, including SLAM-based techniques such as visual SLAM and/or Wi-Fi SLAM, using one or more sensors, such as imaging, inertial, and/or odometry sensors.

Based on the pose determined at block 510, operations for creating a 3D representation of the subject, such as the 3D model 150" discussed above, is controlled at block 530. For example, execution of computer readable program instructions for depth calculation and/or mesh sculpting using images received from the image capture device may be transitioned to an inactive state or otherwise temporarily interrupted when the received images were captured at pose(s) determined to have an accuracy below a predetermined threshold.

FIG. 6 illustrates operations for controlling creation of the 3D representation at block 530 of FIG. 5 in greater detail. Referring now to FIG. 6, an accuracy of the pose (determined at block 510) is identified at block 635. For example, the accuracy of the pose may be identified by calculating and comparing a pose covariance metric to a predetermined threshold, and/or by calculating and comparing a feature point variance metric for foreground and/or background portions of the images to a predetermined threshold. The respective thresholds for the pose covariance metric and the feature point variance metric may be selected such that values that fall within the thresholds indicate that the corresponding images captured by the image capture device can be accurately used for creating a 3D representation of a subject that is represented in the images, while values that exceed or otherwise fall outside the thresholds indicate that the corresponding images should not be used in further image processing operations for creating the 3D representation. More generally, the accuracy of the determined pose may be recognized as an indicator of a validity or reliability of the images captured at from the position and/or at the orientation corresponding to the determined pose.

As such, at block 640, execution of computer readable program code that creates the 3D representation is transitioned or toggled between active and inactive states based on the accuracy of the pose. By controlling image processing operations based on the pose at which the images were captured, images (and image data derived therefrom) that may be unreliable or may otherwise reduce accuracy in creating the 3D representation of the subject may be recognized and discarded or otherwise excluded from further image processing, thereby improving the accuracy of the 3D representation and reducing the use of computing resources in processing such images.

FIG. 7 illustrates operations for controlling creation of a 3D representation of a subject in accordance with some embodiments described herein in greater detail. Referring now to FIG. 7, images are received at block 705 from a camera, such as the image capture device 105 of FIG. 1 or the camera 358 of FIG. 3. A pose of the camera is determined at block 710. The pose may be determined based on image data from the images received at block 705, and/or based on data received from other sensors, such as the sensors 360 of FIG. 3. In some embodiments, SLAM techniques, including VSLAM and/or Wi-Fi SLAM, may be used to determine the pose at block 710, based on data received from the camera and/or sensors. That is, imaging, non-imaging, SLAM-based, and/or non-SLAM based techniques may be used alone or in combination to determine the pose at block 710.

At block 715, pose covariance and/or feature point variance metrics are calculated. The metric(s) calculated at block 715 provide a value estimate as to the accuracy of the pose determined at block 710, and thus, may be used to control further operations for creating a 3D representation of a subject that is represented in the images, such as depth calculation and/or mesh editing operations.

Figure 8:
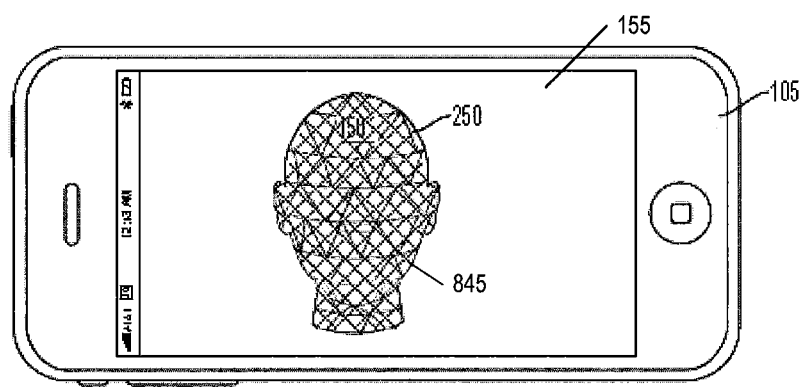
FIGS. 8 and 9 illustrate further example user interfaces of the electronic device of FIGS. 1A and 1B for providing user feedback in controlling operations for creation of a 3D representation of a subject in accordance with some embodiments described herein.

More particularly, the pose covariance and/or feature point variance metrics are compared to respective first thresholds at block 725. The values of the respective first thresholds for the pose covariance metric and the feature point variance metric may be selected based on a desired pose quality that is indicated by the metrics. For example, when the covariance metric is below a predetermined value indicating that pose quality is bad or uncertain, or when the feature point metric is below a predetermined value indicating insufficient variance in positions of the foreground/background feature points, further operations for creating the 3D representation are paused at block 740. That is, execution of computer readable program code that creates the 3D representation is transitioned into an inactive state at block 740 when the comparing (at block 725) indicates that the pose covariance and/or feature point variance metrics exceed or are otherwise outside the respective first thresholds. In a particular example, when the pose quality is determined to be poor or uncertain at block 725, operations for sculpting a 3D mesh representation may be paused or temporarily transitioned to an inactive state at block 740, thereby preventing further sculpting operations that may be likely to delete accurately-calculated values for the 3D mesh representations. An indication of the poor pose quality is provided via a user interface at block 745. For example, as shown in FIG. 8, an indication 845 of poor pose quality is provided by changing the appearance (for example, the color) of the 3D mesh representation 150' displayed on the user interface 155 of the electronic device 105.

The pose covariance and/or feature point variance metrics are further compared to a second threshold at block 737. The second threshold may be selected based on a number of image frames over which the pose covariance and/or feature point variance metrics fall outside the respective first thresholds, that is, how long the poor pose quality has been maintained. If the poor pose quality has not continued for more than the predetermined number of frames, operations return to block 705 where additional images are received, to block 710 where pose is re-determined, and to block 715 where pose covariance and feature point variance metric(s) are re-calculated. If at block 725 the pose covariance and/or feature point variance metrics and/or feature point metrics do not exceed the first thresholds, operations for creating the 3D representation continue at block 750. For example, for the paused sculpting operations discussed above, when the metric(s) indicate that pose quality has returned to a good or acceptable level, sculpting operations are continued at block 750. In some embodiments, the indication of poor pose quality at block 745 is removed and/or an indication of good or acceptable pose quality is provided via the user interface. For example, the changed appearance/color 845 of the 3D mesh representation 150' displayed on the user interface 155 of the electronic device 105 in FIG. 8 may be returned back to its previous appearance/color.

Figure 9:
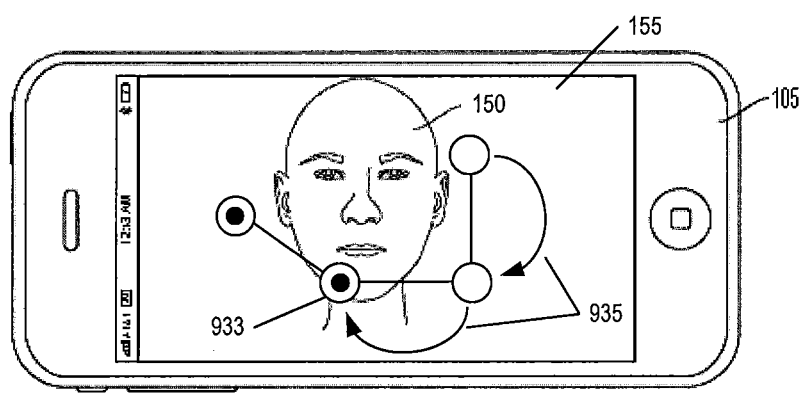

However, if it is determined at block 737 that the poor pose quality has been maintained for more than the predetermined number of frames, directions to alter the current pose are provided via a user interface at block 733, and a suggested pose for re-initialization is identified at block 735. The identification of the suggested pose at block 735 may be performed while continuing to receive and process images from the camera. For example, as shown in FIG. 9, during display of images received from the camera at the current pose, a particular pose 933 among previous poses having acceptable pose quality (indicated by black dots) is identified when the comparing indicates that the pose covariance and/or feature point variance metrics exceed the second threshold, and directions 935 are presented via the user interface 155 of the electronic device 105 as to how to alter the current pose to result in the suggested pose. It will be understood that the particular pose 933 may not exactly correspond to a previous pose, but instead represents a suggested re-location by comparing the incoming data from the camera at the current pose with previously received data from the previous poses. In some embodiments, in controlling sculpting operations, the 3D mesh representation 150' may be removed from the display when poor pose quality is maintained for more than the predetermined number of image frames.

Images from the camera are further received at block 705 in response to providing the directions to alter the pose to a suggested pose at blocks 733 and 735, for determination of the altered pose at block 710 and metrics calculation at block 715, and if the pose covariance and/or feature point variance metrics do not exceed the respective first thresholds at block 725, operations for creating the 3D representation are continued at block 750. That is, execution of the computer readable program code that creates the 3D representation is transitioned from the inactive state (block 740) back to the active state at block 750 if the pose quality metrics determined at block 715 have improved to acceptable levels in response to providing the directions at block 733.

At block 755, it is determined whether sufficient quality has been achieved to complete the 3D representation. If not, operations return to block 705 where further images from the camera are received. That is, operations described herein may be repeated or iterated for multiple scans of the subject, to continuously update and refine the 3D representation (while reducing or avoiding image processing operations based on image data associated with poor pose accuracy) until it is determined that a model of sufficient or desired quality has been achieved at block 755. For example, in controlling sculpting operations, vertices of the polygons of the mesh representation may be iteratively mapped and adjusted by storing and replacing the values of those vertices in a storage medium. If it is determined that sufficient quality has been achieved to complete the 3D representation at block 755, the 3D representation is completed, formatted, and stored in a computer readable storage medium at block 760. The 3D representation is provided for output at block 770. For example, the 3D representation may be provided for output to a display, such as the user interface 155 of the electronic device 105, as part of a 3D, augmented-reality, and/or immersive environment, and/or to generate a 3D print file that may be used by a 3D printer to print a physical copy of the 3D model representation.

As noted above, FIGS. 8 and 9 illustrate further example user interfaces 155 of the electronic device 105 for providing user feedback 845, 935 in creating a 3D representation of a subject in accordance with some embodiments described herein. The user feedback may be presented in the form of an audible and/or visual indication 845 of the poor pose quality, and/or in the form of audible and/or visual directions 935 indicating corrective movement of the image capture device 105 to improve the pose quality above the predetermined threshold, at which accurate 3D modeling operations may be resumed. For example, in FIG. 8, a pose quality below a threshold is displayed via the user interface 155 as a change in appearance/color 845 of the on-screen 3D mesh representation 150' of the subject 150 while sculpting operations are transitioned to an inactive state.

A pose quality that is below a threshold for a predetermined number of image frames may likewise be displayed via the user interface 155, for example, as a further change in appearance/color of the displayed 3D mesh representation 150' of the subject 150, temporarily interrupting display of the 3D mesh representation 150', and/or as on-screen user directions 935. As shown in the example of FIG. 9, augmented reality-based user directions 935 are provided for display via the user interface 155 by integrating one or more on-screen arrows 935 with a displayed image of the subject 150 and/or the environment. The augmented reality-based user directions 935 indicate corrective movement that can be taken by a user or operator of the image capture device 105 to improve the pose quality, based on images received at the current pose. For example, the directions 935 may provide step-by-step indications as to how to return the image capture device 105 to a particular position and/or orientation 933 that was previously identified as having sufficient pose quality for further 3D modeling operations. As noted above, the suggested pose 933 may not exactly correspond to a previous pose, but instead represents a suggested re-location by comparing the incoming images at the current pose with images previously received at the previous pose. Pose may be continually re-determined based on images captured during movement of the image capture device 105 responsive to the directions 935 presented via the user interface 155.

Accordingly, by using pose metrics (for example, as calculated in SLAM) to control operations for creating 3D representations of a subject in accordance with embodiments described herein, deletion and replacement of data representing accurately-modeled portions of a 3D model with inaccurate data can be reduced and/or avoided. In particular examples, embodiments described herein can prevent image processing operations for subdivision of surfaces of polygons defined by the 3D mesh representation and storage of adjusted locations for the vertex positions in instances where these operations would reduce the accuracy of the calculated 3D mesh representation.

In the above-description of various embodiments, it is to be understood that the terminology used herein is for the purpose of describing particular embodiments only and is not intended to be limiting of the embodiments as described herein. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

When an element is referred to as being "connected," "coupled," "responsive," or variants thereof to another element, it can be directly connected, coupled, or responsive to the other element or intervening elements may be present. In contrast, when an element is referred to as being "directly connected," "directly coupled," "directly responsive," or variants thereof to another element, there are no intervening elements present. Like numbers refer to like elements throughout. Furthermore, "coupled," "connected," "responsive," or variants thereof as used herein may include wirelessly coupled, connected, or responsive. As used herein, the singular forms "a," "an," and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise," "comprising," "comprises," "include," "including," "includes," "have," "has," "having," or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits or modules. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions that implement the block(s) of the block diagrams and/or flowchart illustrations may also be stored in a tangible, non-transitory computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module," or variants thereof.

The flowcharts and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles of the present invention. All such variations and modifications are intended to be included herein within the scope of the present invention.

The invention claimed is:

1. An electronic device comprising:
a processor; and
a memory coupled to the processor and comprising a computer readable storage medium having computer readable program instructions stored therein that are executable by the processor to perform operations comprising:
determining a position and/or orientation of a sensor device, wherein the sensor device is arranged to capture data for a subject from the position and/or at the orientation; and
based on the position and/or orientation that was determined, controlling creation of a three-dimensional, 3D, representation of the subject from the data captured by the sensor device,
wherein the position and/or orientation define a pose, and wherein controlling the creation comprises:
identifying an accuracy of the pose that was determined, wherein identifying the accuracy of the pose comprises calculating a pose quality comprising a covariance metric for the pose, and comparing the pose quality to a predetermined threshold; and
based on the accuracy of the pose, transitioning execution of computer readable program code that creates the 3D representation of the subject between active and inactive states.

2. An electronic device according to claim 1, wherein the computer readable program code comprises computer readable program instructions for editing the 3D representation of the subject, and wherein transitioning the execution comprises:
transitioning between active and inactive states of the editing based on the pose to prevent the editing of the 3D representation based on the data when the comparing indicates that the pose quality exceeds the predetermined threshold.

3. An electronic device according to claim 2, wherein the editing comprises sculpting of the 3D representation, and wherein transitioning the execution comprises:
transitioning the sculpting to the inactive state when the comparing indicates that the pose quality is outside the predetermined threshold.

4. An electronic device according to claim 3, wherein transitioning the execution further comprises:
transitioning the sculpting to the active state when the comparing indicates that the pose quality metric is within the predetermined threshold.

5. An electronic device according to claim 3, wherein controlling the creation further comprises:
providing an indication that the pose quality is outside the predetermined threshold for output via a user interface.

6. An electronic device according to claim 3, wherein the predetermined threshold comprises a first threshold, and wherein controlling the creation further comprises:
identifying a suggested pose for re-initialization when the comparing indicates that the pose quality exceeds a second threshold; and
providing a direction to alter the pose based on the suggested pose for output via a user interface.

7. An electronic device according to claim 6, wherein providing the direction to alter the pose comprises:
generating an augmented reality view comprising the direction to alter the pose in combination with the data captured by the sensor device from the position and/or at the orientation; and
providing the augmented reality view for display via the user interface.

8. An electronic device according to claim 6, wherein the suggested pose comprises one of a plurality of poses of the sensor device that corresponds to one or more previous images captured by the sensor device.

9. An electronic device according to claim 1, wherein the computer readable program code comprises computer readable program instructions for depth calculation, and wherein controlling the creation further comprises:
based on the pose that was determined, preventing execution of the computer readable program instructions for depth calculation operations.

10. An electronic device according to claim 1, wherein identifying the accuracy of the pose comprises:
identifying a plurality of feature points in foreground and/or background portions of images captured by the sensor device from the position and/or the orientation;
calculating a variance metric based on respective positions indicated by the plurality of feature points in the foreground and/or background portions of the images; and
determining the accuracy of the pose based on the variance metric.

11. A method of creating a three-dimensional, 3D, representation of a subject, the method comprising:
executing, by at least one processor, computer readable instructions stored in a non-transitory computer readable storage medium to perform operations comprising:
determining a position and/or orientation of a sensor device, wherein the sensor device is arranged to capture data for the subject from the position and/or at the orientation; and
based on the position and/or orientation that was determined, controlling creation of the 3D representation of the subject from the data captured by the sensor device,
wherein the position and/or orientation define a pose, and wherein controlling the creation comprises:
identifying an accuracy of the pose that was determined, wherein identifying the accuracy of the pose comprises calculating a pose quality comprising a covariance metric for the pose, and comparing the pose quality to a predetermined threshold; and
based on the accuracy of the pose, transitioning execution of computer readable program code that creates the 3D representation of the subject between active and inactive states.

12. A method according to claim 11, wherein the computer readable program code comprises computer readable program instructions for editing the 3D representation of the subject, and wherein transitioning the execution comprises:
transitioning between active and inactive states of the editing based on the pose to prevent the editing of the 3D representation based on the data when the comparing indicates that the pose quality exceeds the predetermined threshold.

13. A method according to claim 12, wherein the editing comprises sculpting of the 3D representation, and wherein transitioning the execution comprises:
transitioning the sculpting to the inactive state when the comparing indicates that the pose quality is outside the predetermined threshold.

14. A method according to claim 13, wherein transitioning the execution further comprises:
transitioning the sculpting to the active state when the comparing indicates that the pose quality metric is within the predetermined threshold.

15. A method according to claim 13, wherein the predetermined threshold comprises a first threshold, and wherein controlling the creation further comprises:
identifying a suggested pose for re-initialization when the comparing indicates that the pose quality exceeds a second threshold; and
providing a direction to alter the pose based on the suggested pose for output via a user interface.

16. A method according to claim 11, wherein identifying the accuracy of the pose comprises:
identifying a plurality of feature points in foreground and/or background portions of images captured by the sensor device from the position and/or the orientation;
calculating a variance metric based on respective positions indicated by the plurality of feature points in the foreground and/or background portions of the images; and
determining the accuracy of the pose based on the variance metric.

17. A computer program product comprising a non-transitory computer readable storage medium having computer readable program instructions embodied therein that, when executed by a processor, causes the processor to perform the method according to claim 11.

18. A computer program product, comprising:
a non-transitory computer readable storage medium comprising computer readable program instructions embodied therein that, when executed by a processor, causes the processor to perform operations comprising:
determining a position and/or orientation of a sensor device, wherein the sensor device is arranged to capture data for a subject from the position and/or at the orientation; and
based on the position and/or orientation that was determined, controlling creation of a three-dimensional, 3D, representation of the subject from the data captured by the sensor device,
wherein the position and/or orientation define a pose, and wherein controlling the creation comprises:
identifying an accuracy of the pose that was determined, wherein identifying the accuracy of the pose comprises calculating a pose quality comprising a covariance metric for the pose, and comparing the pose quality to a predetermined threshold; and
based on the accuracy of the pose, transitioning execution of computer readable program code that creates the 3D representation of the subject between active and inactive states.

\* \* \* \* \*